US007117126B2

(12) United States Patent
Floyd et al.

(10) Patent No.: US 7,117,126 B2
(45) Date of Patent: Oct. 3, 2006

(54) DATA PROCESSING SYSTEM AND METHOD WITH DYNAMIC IDLE FOR TUNABLE INTERFACE CALIBRATION

(75) Inventors: Michael Stephen Floyd, Austin, TX (US); Ravi Kumar Arimilli, Austin, TX (US); Daniel Mark Dreps, Georgetown, TX (US); Frank David Ferraiolo, Essex Junction, VT (US); Kevin F. Reick, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 09/946,217

(22) Filed: Sep. 5, 2001

(65) Prior Publication Data

US 2003/0046596 A1 Mar. 6, 2003

(51) Int. Cl.
*G06F 11/30* (2006.01)

(52) U.S. Cl. ............... 702/186; 702/85; 702/89; 702/99; 703/21; 703/22; 714/25; 709/221; 709/224

(58) Field of Classification Search ............. 370/489; 710/60; 718/100; 702/85, 89, 99, 186; 713/400; 340/870.04, 870.17; 709/221, 224; 703/21, 703/22; 714/25
See application file for complete search history.

(56) References Cited

U.S. PATENT DOCUMENTS

| 4,642,636 | A * | 2/1987 | Smith et al. ......... 340/870.041 |
| 5,471,581 | A * | 11/1995 | Munier et al. ............. 711/156 |
| 6,334,163 | B1 * | 12/2001 | Dreps et al. ............... 710/260 |
| 6,542,465 | B1 * | 4/2003 | Wang ........................ 370/232 |
| 6,772,245 | B1 * | 8/2004 | Pomerantz et al. .......... 710/60 |
| 2002/0097748 | A1 * | 7/2002 | Ho ............................. 370/489 |

* cited by examiner

*Primary Examiner*—William Thomson
*Assistant Examiner*—Qing-Yuan Wu
(74) *Attorney, Agent, or Firm*—Casimer K. Salys; Dillon & Yudell LLP (57) ABSTRACT

A data processing system includes a mechanism to periodically idle the normal system operation to allow recalibration of its interface circuitry by transmission of data with transitions and logic levels indicative of actual operation. Provision is made to protect actual data of the system from corruption during recalibration.

25 Claims, 9 Drawing Sheets

DATA PROCESSING SYSTEM AND METHOD WITH DYNAMIC IDLE FOR TUNABLE INTERFACE CALIBRATION

BACKGROUND OF THE INVENTION

1. Technical Field

The present invention relates to data processing, and, more particularly to data processing systems and methods capable of recalibrating to optimize performance during the course of their functional operations.

2. Description of the Related Art

In high speed data processing systems, chip to chip interfaces (such as Elastic Interfaces) have been provided to compensate for static manufacturing and design variables. Examples of static variables are doping levels in silicon in the chips, variations in electrical line length and width on chips and Printed Circuit Boards (PCB's), inherent design tolerances, and the like. Static variables are typically fixed after manufacturing and rennin generally constant over the life of the product. In order to adjust for the effect of static variables, systems and methods to compensate have been developed. Compensation for these variables occurred at system power-on. During the compensation process, signals on an interface in the system were appropriately adjusted on the receive chip's silicon to optimize performance. This compensation is accomplished in what are known in the art as tunable interfaces. An example tunable interface process from the assignee of the present application is referred to as the Initialization Alignment Procedure (IAP). The IAP is described, for example, in a co-pending commonly owned, U. S. patent application: "Elastic Interface Apparatus and Method Thereof", Ser. No. 09/434,801, now U.S. Pat No. 6.542.999, filed Nov. 5, 1999. The IAP requires on the order of half a millisecond to accomplish and is a sub-process within the composite high speed data processing system power-on procedure, which typically can take several seconds or minutes to complete.

As microprocessor frequencies continue to increase, their buses to cache, memory, and I/O devices must also increase in frequency to keep the processor fed with instructions and data. To reach these high bus speeds, more aggressive interface device designs must be incorporated on the microprocessor and support chips. Additionally, in an operating computer system, changes in temperature and voltage seen by the chips transmitting and receiving data on the bus interfaces of the system normally occur. These changes may cause the timing of data being transmitted across that bus interface to drift. Past interface designs took this variation into account as part of the margin for uncertainty and resulted in much slower interface speeds since the drift terms accounted for up to 50% of the data valid window margins.

SUMMARY OF THE INVENTION

It is therefore an object of the present invention to provide a data processing system and method to idle transmission of data between data processing devices in order for recalibration of interfaces between the devices.

It is another object of the present invention to provide a data processing system and method where data transfer of actual system data over tunable interfaces is allowed to complete before the interfaces are idled for the purposes of recalibration.

It is a further object of the present invention to provide a data processing system and method with tunable interfaces between the devices or chips which can be adjusted at selected times and frequencies according to when recalibration is more likely to be required.

It is another object of the present invention to accomplish these adjustments with minimum disruption to system execution and performance.

A data processing system and process are disclosed which periodically idle system operation and allow a suitable test data activity to be transmitted across interfaces, such as between devices or integrated circuit chips, or on the same integrated circuit chip, of the system for the purposes of re-calibration of the interfaces. With the present invention, the interface calibrations operate in concert with the data processing system—while no mission critical or actual system data is being transmitted. The re-calibrations can now take place and if data is corrupted it is of no consequence.

This mechanism works well for "slave" type interfaces, such as cache and memory interface chips where the master (such as a microprocessor chip) is the only chip to initiate interface activity and the data return time is measured in cycles. The present invention also provides for more complex situations which occur. For example, the present invention takes into account such situations in input/output, or I/O, devices where it can take data a considerable time in terms of data processing reference, to return, such as from a disk drive, NUMA bridge, or the like. The present invention also allows idling and reconfiguring of devices (such as an I/O chip) which can themselves initiate traffic back in the other direction (e. g., external interrupts). For this type interface it is necessary to hold the arbiters on both sides of the interface and wait until both sides of the interface are idle before starting the recalibration.

With the present invention, the interface calibrations operate in concert with the system—while no mission critical or actual system data is being transmitted. The re-calibrations can now take place and any data which is corrupted is test data and thus the corruption is of no consequence, since the test data is discarded.

The foregoing and other objects and advantages of the present invention will be apparent to those skilled in the art, in view of the following detailed description of the preferred embodiment of the present invention, taken in conjunction with the appended claims and the accompanying drawings.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
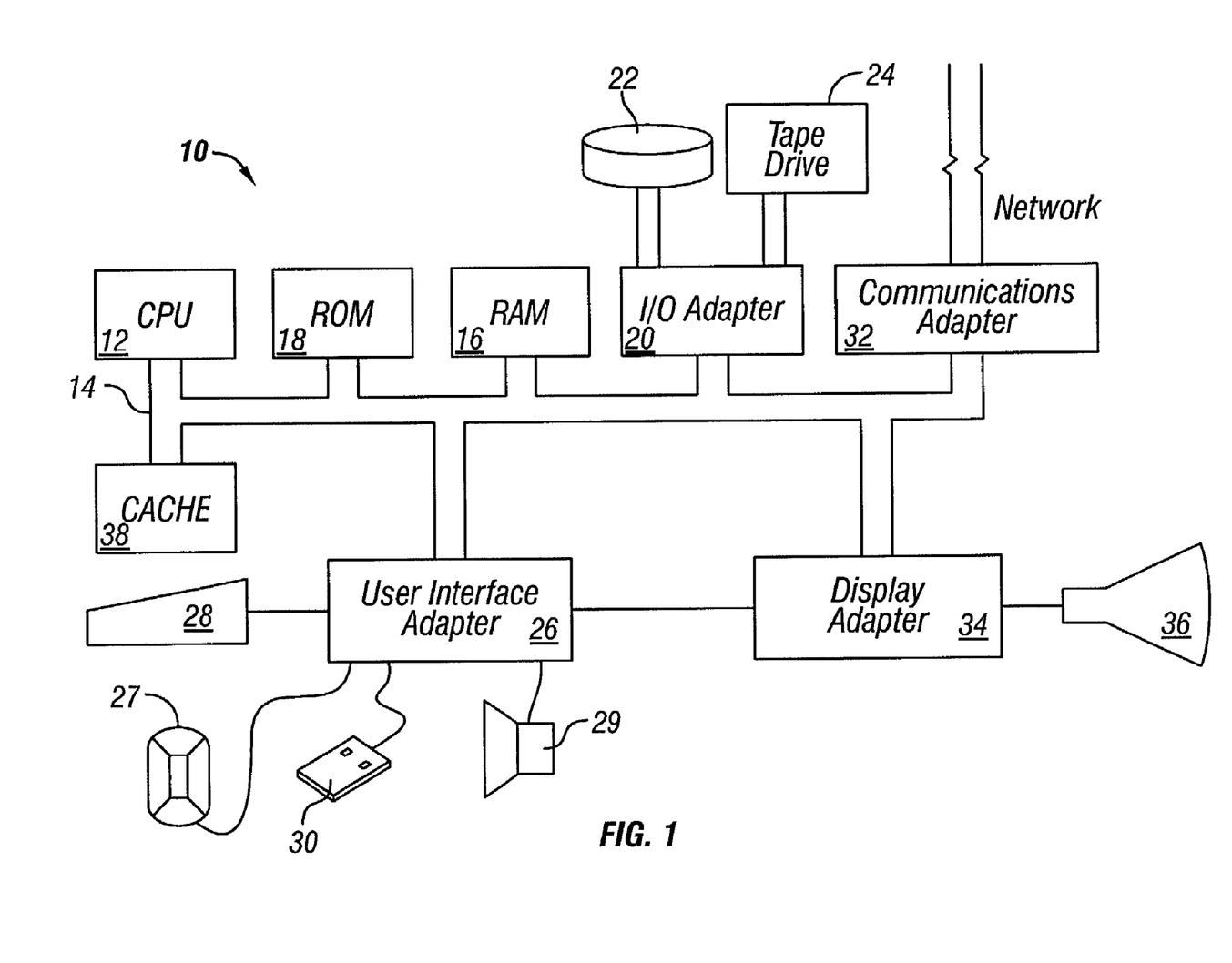
FIG. 1 is a block diagram of a representative data processing system in which the present invention is practiced.

A representative hardware environment for practicing the present invention is depicted in FIG. 1, which illustrates a typical hardware configuration of data processing system 10 in accordance with the subject invention having central processing unit (CPU) 12, such as a conventional microprocessor, and a number of other units interconnected via system bus 14. Data processing system 10 includes random access memory (RAM) 16, read only memory (ROM) 18, and input/output (I/O) adapter 20 for connecting peripheral devices such as disk units 22 and tape drives 24 to bus 14. Data processing system 10 also includes a user interface adapter 26 for connecting keyboard 28, mouse 30, and/or other user interface devices such as a microphone or audio input 27, an audio speaker system 29, and touch screen device (not shown) to bus 14. The data processing system of FIG. 1 further includes a communication adapter 32 for connecting workstation 10 to a data processing network, a display adapter 34 for connecting bus 14 to display device 36, and a cache memory 38 in addition to internal cache typically present in the CPU 12. CPU 12 may include other circuitry not shown herein, which will include circuitry commonly found within a microprocessor, e.g., execution unit, bus interface unit, arithmetic logic unit, etc.

In the data processing system 10, a number of the components shown in FIG. 1 as described above are provided as one or more separate integrated circuit chips. According to the present invention, these separate integrated circuit chips are defined as data processing devices. Each of those data processing devices which transfers data with other components of the system 10 and with other members of a network associated with the system 10, is provided with tunable interfaces of like number to the number of devices to which data is transferred. The present invention is adapted for implementation in a variety of tunable interfaces which compensate for variations such as static variables, or from other causes such as temperature or voltage variations.

Figure 2:
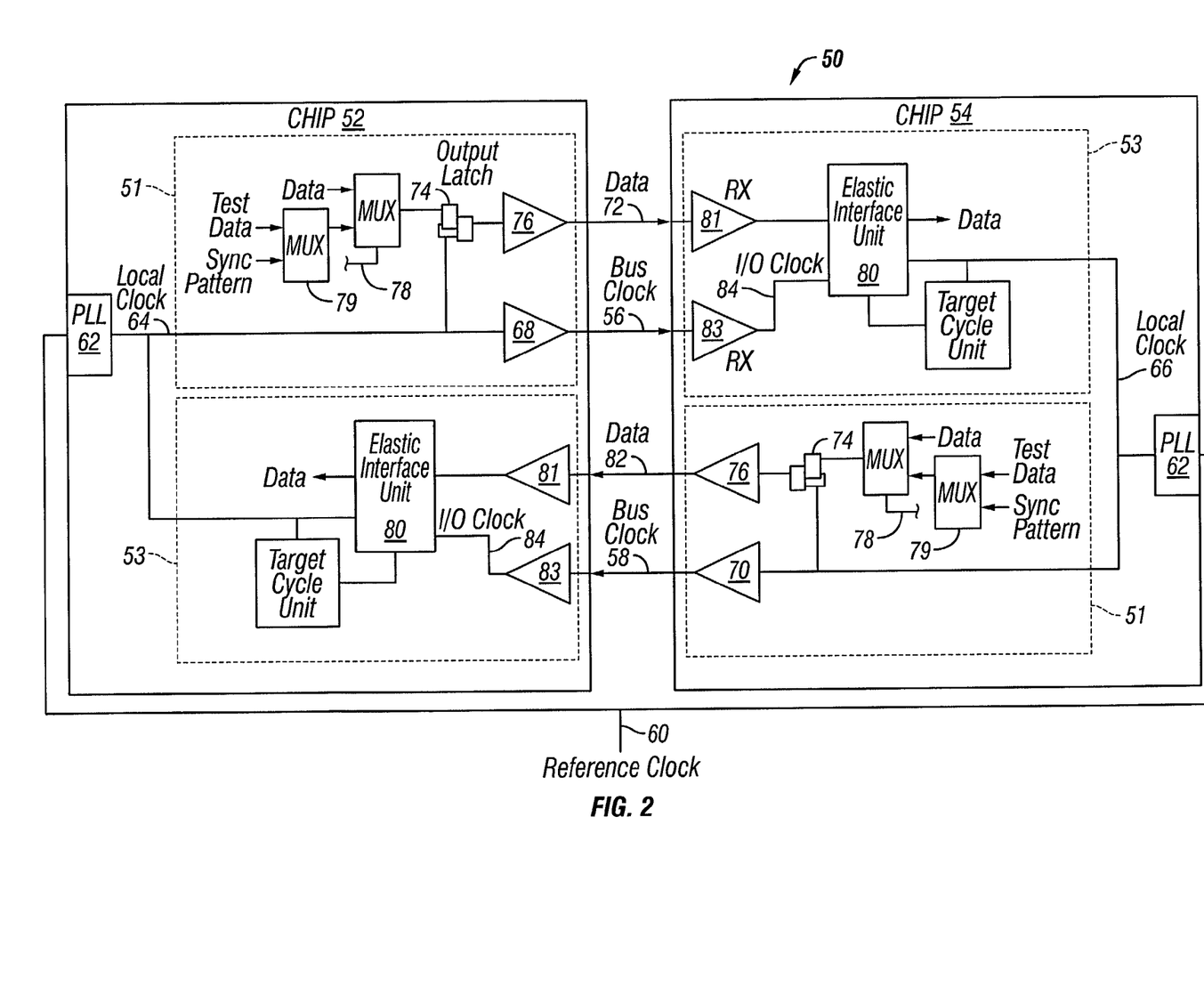
FIG. 2 is a block diagram of a tunable interface in the data processing system of FIG. 1.

An example of such a tunable interface is an elastic interface 50 as shown in FIG. 2. Further details of the elastic interface 50 are contained in co-pending, commonly owned, U.S. patent application: "Elastic Interface Apparatus and Method Thereof", Ser. No. 09/434,801, now U.S. Pat. No. 6,542,999, filed Nov. 5, 1999, which is incorporated herein by reference for all purposes. It should be understood that the present invention is also capable of being practiced in data processing devices with other known forms of tunable interfaces than elastic interfaces.

Refer now to FIG. 2 an example tunable interface in the form of an elastic interface system 50 is illustrated incorporated in each of a representative chip or data processing device 52 and a representative chip or data processing device 54 which communicate data with each other via the interface 50. The data processing devices 52 and 54 represent schematically any of the data processing devices of the data processing system 10 as described above. Data is transferred from an elastic drive interface 51 in chip 52 to an elastic receive interface 53 in chip 54 and conversely from an elastic drive interface 51 in chip 54 to an elastic receive interface 53 in chip 52.

The data transfer between chips 52 and 54 occurs at a rate determined by a bus clock 56 in device 52 and a bus clock 58 in device 54. Bus clocks 56 and 58 are nominally the same frequency, and are derived from reference clock 60 provided to a phase locked loop or PLL 62 provided of like construction in each of chips 52 and 54. In an embodiment of the present invention, reference clock 60 may be a system clock. Each PLL 62 outputs a local clock, specifically a local clock 64 in chip 52 and local clock 66 in chip 54, which is locked in phase to reference clock 60, and may be a preselected integer M multiple of the period of reference clock 60. As an alternate, chip 54 may use bus clock 56 as its internal clock source rather than a PLL. This bus clock frequency may be divided down by some integer value N to form the local clock. Local clock 64 is buffered by driver 68 to provide bus clock 56 from chip 52. Similarly, local clock 66 is buffered by driver 70 to provide bus clock 58 from chip 54.

The bus clock is provided along with the data communicated from the chip. Data 72 from elastic drive interface 51 in chip 52 is latched into output latch 74 and driven and buffered by driver 76. The data is latched on a preselected edge of local clock 64. The data is received into latch 74 via multiplexer (MUX) 78. MUX 78 also receives from another multiplexer 79 at selected times either a predetermined synchronization pattern in conjunction with the initialization alignment procedure, or test data during idle intervals for recalibration of the interfaces.

Figure 3:
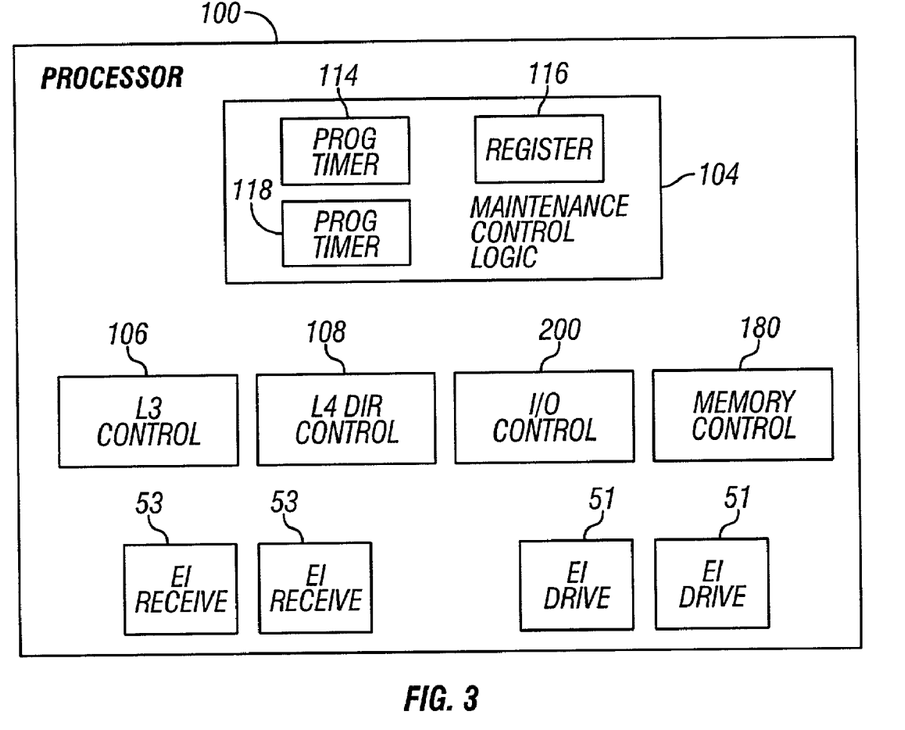
FIG. 3 is a block diagram of selected portions of a processor of the data processing system of FIG. 1.

Data 72 is buffered by receiver (RX) 81 in elastic receive interface 53 in chip 54 and provided to an elastic interface unit 80. Bus clock 56 send along with data 72 is buffered by RX 82, the output of which farms I/O clock 84, also provided to elastic interface unit 80 in elastic receive interface 53 in chip 54. The operation of elastic interface unit 80 and the remaining portions of the interface system 50 in FIG. 3 are described in detail in the above identified commonly owned, co-pending (U.S. patent application Ser. No. 09/434, 801, now U.S. Pat. No. 6,542,999, which is incorporated by reference.

Data 82 from the elastic drive interface 51 in chip 54 is sent to chip 52, along with bus clock 58, and is similarly received by elastic receive interface 53 in chip 52. It should be understood that the operation of elastic drive interface 51 in chips 54 and elastic receive interface 53 in chip 52 occurs in a like manner to the transfer of data by chip 52 to chip 54 in the manner described above. It should be understood that the description of elastic interfaces is by way of a preferred embodiment and that the present invention may also be used with other forms of tunable interfaces.

FIG. 3 is a block diagram of portions of a processor chip 100 of the CPU 12 of the data processing system of FIG. 1. Those portions of the processor chip 100 shown in FIG. 3 control the idling of the transfer of system data between various data processing devices of the data processing system 10 according to the present invention. Various portions of processor chip 100 shown schematically in FIG. 3 are illustrated in more detail in either FIG. 4, FIG. 5 or FIG. 6 and are described in more detail below.

With the present invention, the data processing system 10 periodically forms idle intervals in time which allow the elastic interfaces of FIG. 2 to properly re-calibrate. A "rich" pattern of test data of desired form and content required for calibration can be transmitted over the interface through MUX 79 and the MUX 78 (FIG. 2) to ensure an adequate information is provided for calibration and mission critical or system data is not present.

According to the present invention, a "rich" pattern must have adequate transitions and logic levels present during the relatively short duration (for example several hundred bus cycles or nanoseconds) of the idle interval indicative of behavior of the interface during its normal operation over a considerably longer time. Thus, the number of transitions and logic levels during the idle intervals is considerably greater than would occur during a corresponding amount of time when system data is being transferred.

Figure 4:
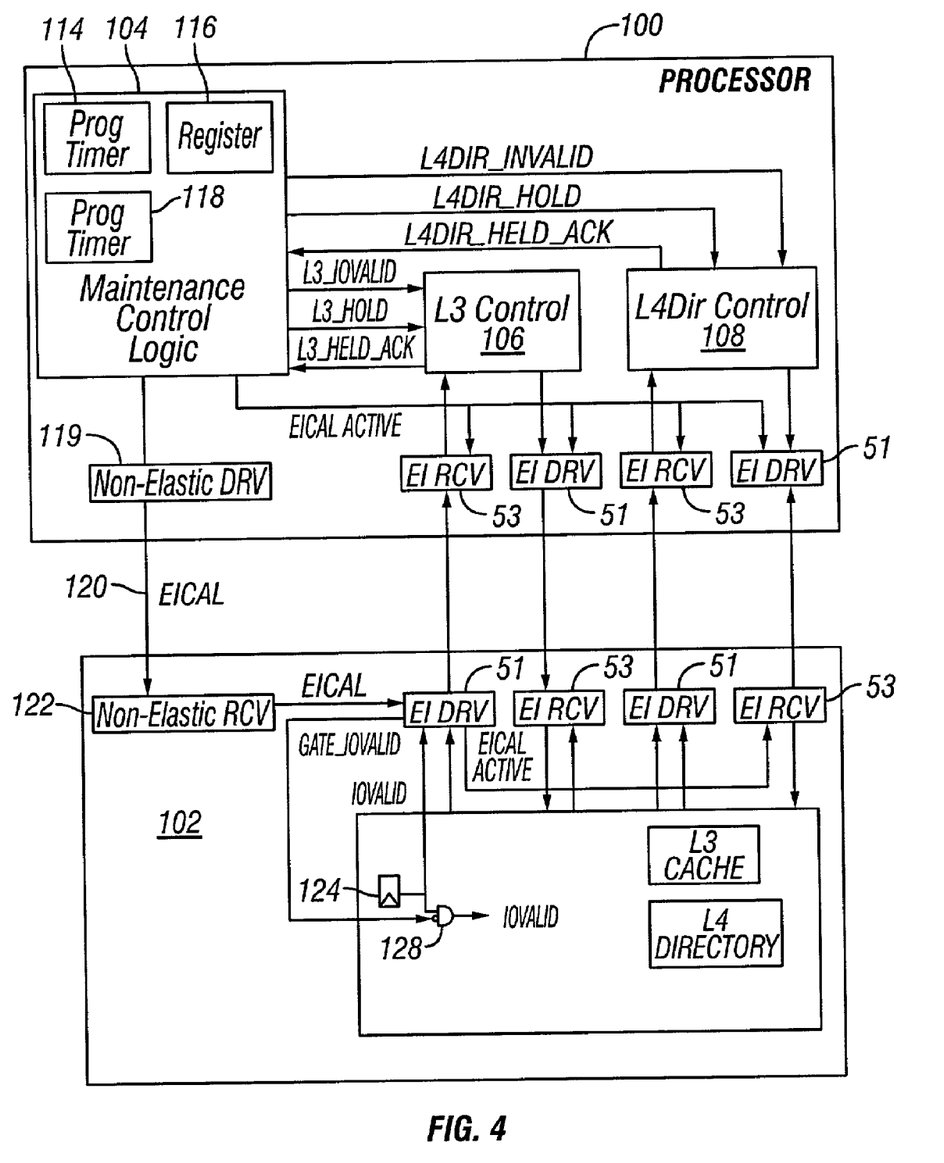
FIG. 4 is a block diagram of a calibration system with periodic idling of the tunable interfaces between the processor and cache of the data processing system of FIG. 1.

FIG. 4 in the drawings illustrates a specific implementation between data processing devices according to the present invention in connection with tunable interfaces of the type described generally and illustrated in FIG. 2 above. In FIG. 4, the microprocessor chip 100 of the CPU 12 of FIGS. 1 and 3 is depicted as a first data processing device and a cache chip 102 in the cache 38 is depicted as a second data processing device. Since only the microprocessor chip 100 is capable of initiating interface activity it is referred to as a "master," while the cache chip 102 is referred to as a "slave," since it can only respond to interface activity begun by microprocessor chip 100. The microprocessor chip 100 (FIGS. 3 and 4) includes maintenance control logic 104, an L3 cache control logic 106 and an L4 directory control logic 108. Other conventional components of processor chip 100 are not shown in the drawings to preserve clarity therein. Each of the L3 cache control logic 106 and the L4 directory control logic 108 is connected to elastic drive interface 51 and elastic receive interface 53 described above.

The maintenance control logic 104 includes a programmable timer 114, a status register 116 and a programmable cycle counter 118. The programmable timer 114 periodically sends time signals to indicate that an idle interval is required. The status register 116 indicates by providing an IO VALID output that the data being transferred over the between the interfaces is actual system data. During the idle intervals, the IO VALID output of register 116 is gated off, indicating that test data is being transferred between the interfaces for recalibration purposes. The timer 118 is a cycle counter which counts contained programmable numbers of system clock pulses to control the timing and sequence of operation of the processor 100 during the idle and recalibration interval, as will be set forth. The maintenance control logic 104 is connected through a conventional non-elastic drive buffer 119 over a dedicated conductor 120 to a non-elastic receive buffer 122 in the cache chip 102. The cache chip 102 contains an IOVALID Mode Register latch 124 and gate logic 128. The cache chip 102 is otherwise conventional and contains an L3 cache 130 and an L4 directory 132.

The present invention periodically idles system operation and allow a suitable data activity to be transmitted across the interfaces for the purposes of re-calibration. Further, the re-calibration takes place in defined intervals so that changes can be tracked and compensated—for example the interface can track and compensate for temperature variations which take place between calibration intervals. Another defined time of temperature or voltage variation is during a maintenance operation or upgrade when components may be taken off line or new components added. The present invention can also periodically idle system operation for purposes of recalibration in response to sensed environment conditions, such as sensed internal temperature in the area of computer components, if desired.

In the operation of the embodiment of FIG. 4, the programmable timer 114 activates maintenance control logic 104 with an INITIATE_EICAL according to the timing schedule contained in its programmed memory to begin the operation necessary to idle the interfaces for recalibration. The frequency of occurrence of this signal may be set to be every one hundred milliseconds, for example. The frequency may be also selectively varying at specific operating times, such as start-up and shut down.

For example, if desired, the present inventions permits gradual deramping of calibration frequency. The most significant temperature variation often occurs during the first few minutes, or tens of minutes, of system power-on. The timer 114 can if desired be configured to perform more frequent recalibrations during this period of time following the system IPL, and then gradually increase the period between calibrations until the system reaches a steady state operating environment. For example, after IPL an interface may be recalibrated every 1 millisecond for the first 30 seconds, every 10 milliseconds for the next two minutes, every 50 milliseconds for the next 10 minutes, and then every 100 milliseconds once the system has reached steady state. Alternately, a more gradual ramp-down of recalibration period could also be provided, for example start at a 100 microsecond recalibration period and add 100 microseconds for each recalibration until the 100 millisecond steady state value.

The programmable timer 114 activates maintenance control logic 104 according to the timing schedule contained in its programmed memory to begin the operation necessary to idle the elastic interfaces with cache chip 102 for recalibration. The pulse to begin idling of the elastic interfaces occurs at appropriate times in response to the programmable timer, typically at least every 100 msec. If such a pulse occurs before the last recalibration has completed, then maintenance control logic 104 sets an error bit in one of the conventional fault isolation registers present in processor chip 100.

During normal operations, maintenance control logic 104 when activated by timer 114 sends an L3_HOLD level to L3 cache control 106 and an L4 DIR_HOLD level to L4 directory control logic 108, requesting that no new transactions be sent out of the controllers to the cache chip 102. Maintenance control logic 104 then waits for acknowledge indications. L3 cache control 106 subsequently sends an L3_HELD_ACK acknowledge indication pulse to maintenance control logic 104 when there are no L3 transactions outstanding to cache chip 102. Similarly, L4 directory control logic 108 sends an L4 DIR_HELD_ACK acknowledge indication pulse when there are no L4 transactions outstanding to cache chip 102. Mode latch 116 provides an IOVALID signal for the control logic to use to determine whether the interface contains valid system data.

When each of these pulses has been received, maintenance control logic 104 gates off the IOVALID latch 116 to form an L3_IOVALID to L3 cache control 106 and an L4 DIR_IOVALID to L4 directory control logic 108. This is an indication that the idle interval for recalibration is beginning and that the data being transferred should not be regarded as actual system data. Maintenance control logic 104 waits for an L3_HELD_ACK and an L4 DIR_HELD_ACK indication in response. Maintenance control logic 104 raises EICAL_ACTIVE to cache chip 102, which receives EICAL_ACTIVE over conductor 120 and allows that asynchronous signal to stabilize and any transient effects to subside, also known as deglitching. Cache chip 102 forms an internal EICAL indication in non-elastic receive buffer 122 which is transferred to a selected one of the elastic interfaces 51 in the cache chip 102, which forms an EICAL_ACTIVE signal to be sent to each of the other elastic interfaces 51 and 53 in the cache chip 102. The selected interface 110 also at this time raises a GATEIO_VALID to the internal logic of cache chip 102, causing such internal logic to deactivate IOVALID for the interface with processor 100.

Maintenance control logic 104 then waits a programmable delay period determined for the other chip to raise its gate. This delay is determined by the programmable timer 118. Maintenance control logic 104 then raises an EICAL_ACTIVE signal to control a multiplex or mux select function in each of the elastic drive and receive interfaces 51 and 53 in the processor chip 100 that communicate with the cache chip 102. The delay period is selected to be from 12 to 64 clock cycles counted by counter 118 for signal level stabilization and transition. When EICAL_ACTIVE is asserted, the drive interfaces 51 can then provide through MUX 78 in the manner set forth above representative test data patterns "rich" in data content for the duration of the calibration period. The calibration period may any suitable number of clock bus cycles, but is typically 64 or 128 bus cycles. At the end of this interval, maintenance control logic 104 then drops the EICAL_ACTIVE. Maintenance control logic 104 then waits a second number of bus cycles before dropping the EICAL_ACTIVE signal on conductor 120 to cache chip 102. This allows the receive sections to begin to receive system data from the processor 100 before the IOVALID function is degated in the cache chip 102. A fixed number of bus cycles after the EICAL_ACTIVE level on conductor 120 drops, the selected interface 110 in cache chip 102 then switches the state of the IOVALID gate logic 128. Maintenance control logic 104 then waits the programmable delay period before changing the state of L3_IOVALID level to L3 cache control 106 and LADIR_IOVALID level to L4 directory control logic 108 and dropping L3_HOLD and L4DIR_HOLD to allow the processor 100 to see valid system data from the cache chip 102.

Figure 5:
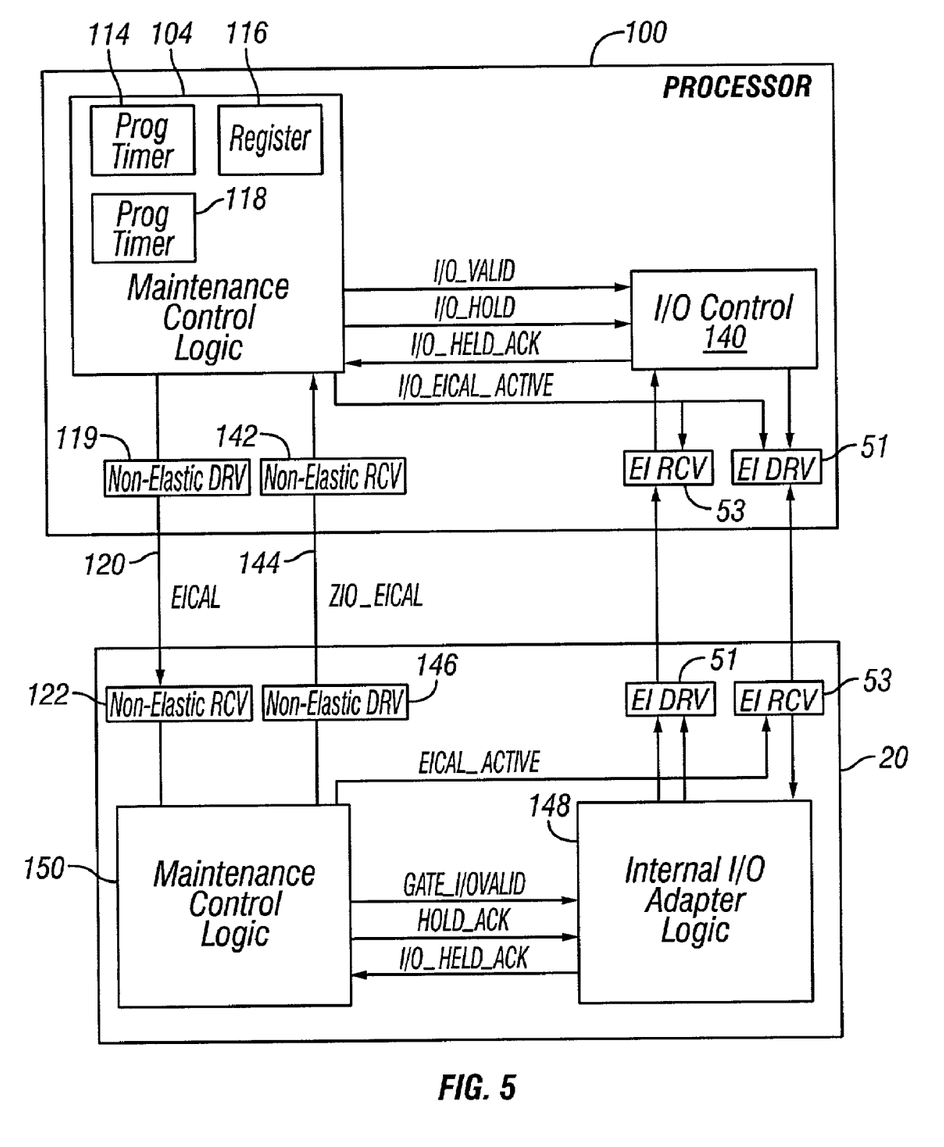
FIG. 5 is a block diagram of a calibration system with periodic idling of the tunable interfaces between the processor and I/O control of the data processing system of FIG. 1.

FIG. 5 in the drawings illustrates an embodiment of the present invention where each of the data processing devices is capable of initiating interface activity. In FIG. 5, the microprocessor chip 100 of CPU 12 is the first data processing device and the I/O adapter 20 is the second data processing device. Both the microprocessor chip 100 and the I/O adapter 20 can begin or initiate interface activity, but only the microprocessor chip 100 is capable of periodically idling the elastic interfaces for their recalibration according to the present invention. In FIG. 5, like structure to that of FIG. 4 bears like reference numerals.

Thus in FIG. 5, the microprocessor chip 100 includes maintenance control logic 104, like that of FIG. 4, and other conventional components of processor chip 100 are not shown in the drawings to preserve clarity therein. The microprocessor chip 100 in FIG. 5 also includes an I/O control logic 140. The I/O control logic 140 is provided with an elastic receive interface 53 and an elastic drive interface 51, of like construction to the elastic interfaces already described.

The maintenance control logic 104 includes a programmable timer 114 and a control register 116 and a programmable cycle counter 118. The programmable timer 114 may be the same timer as that described in FIG. 4, which is also set to further periodically send time signals to indicate that an idle interval is required for I/O adapter 20. The times may be different from the times set for other operations. The timing signals for I/O adapter 20 may also be provided by a separate timer (not shown) from timer 114, which may be different from the times set for other operations.

The control register 116 indicates by providing an IOVALID output to I/O control 140 that the data being transferred between the interfaces is actual system data. During the idle intervals, the IOVALID output of register 116 is an opposite level, indicating that the interface does not contain valid system data and should be disregarded. The timer 118 is a cycle counter which counts certain programmable numbers of system clock pulses to control the timing and sequence of operation of the processor 100 during the idle and recalibration interval, as has been set forth, indicating when appropriate that an I/O operation to I/O adapter 20 is in progress. The maintenance control logic 104 is connected through a conventional non-elastic drive interface 119 over a dedicated conductor 120 to a non-elastic receive interface 122 in the I/O adapter 20. The maintenance control logic 104 is also connected through a conventional non-elastic receive interface 142 over a dedicated conductor 144 to a conventional non-elastic drive interface 146 in the I/O adapter 20. The I/O adapter 20 includes conventional internal I/O adapter logic 148.

The I/O adapter 20 also contains a maintenance control logic 150 which operates in a similar manner to the maintenance control logic 104, except that it does not respond to an internal programmable timer to begin the periodic idle intervals for calibration. Rather, maintenance control logic 150 responds to an EPICAL level over the conductor 120. The I/O adapter 20 has an elastic drive interface 51 connected to the elastic drive interface 53 in processor chip 100 and an elastic drive interface 53 connected to the elastic drive interface 51 in processor chip 100.

In the operation of the portions of data processing system 10 shown in FIG. 5, I/O_HOLD is a level requesting that no new transactions be sent out of the maintenance control logic 104 from processor 100 to the I/O adapter 20. In the I/O adapter 20, I/O_HOLD is a level out of the maintenance control logic 150 through I/O adapter logic 148 and elastic drive interface 51 back to processor 100. I/O_HELD_ACK is a pulse that occurs in I/O control 140 of processor 100 after I/O_HOLD is active, once there are no outstanding transactions to I/O adapter 20, indicating all responses to requests are back, but not necessarily that the data return has completed.

I/OEICAL_ACTIVE is a level which directly controls mux selects 78 and 79 inside the elastic drive interface 51 in processor chip 100 between system or mission data and calibration patterns, as has been set forth. When I/OEICAL_ACTIVE is asserted, the elastic drive interface 51 provides the "rich" test data patterns for calibration purposes across the interface.

The programmable timer 114 activates maintenance control logic 104 according to the timing schedule contained in its programmed memory to begin the operation necessary to idle the elastic interfaces with I/O adapter 20 for recalibration. The INITIATE I/O EPICAL pulse occurs at appropriate times in response to the programmable timer, typically at least every 100 msec. Again if INITIATE I/O EPICAL occurs before the last recalibration I/O VALID has completed, then maintenance control logic 104 sets an error bit in one of the conventional fault isolation registers present in processor chip 100.

Maintenance control logic 104 next raises HOLD_I/O furnished to I/O control 140 and waits for an I/O_HELD_ACK indication in response. Maintenance control logic 104 raises EICAL_ACTIVE to I/O control chip 140, which receives EICAL_ACTIVE and allows that asynchronous signal to stabilize and any transient effects to subside, also known as deglitching. I/O control chip 140 forms an internal EICAL_REQUEST indication, at which time it raises HOLD_VOCHIP to internal I/O chip logic 148.

Maintenance control logic 150 in I/O control 140 waits for an IOCHIP_HELD_ACK indication. Maintenance control logic 150 also raises GATE_IOVALID, causing the internal I/O chip logic 140 to deactivate IOVALID for the drive interface 51 to the processor 100. Maintenance control logic 150 also raises EICAL_OK to processor chip 100 across the asynchronous dedicated conductor 144.

Maintenance control logic 150 waits a programmable delay period before raising EICAL_ACTIVE to the elastic interfaces in I/O control 140 that communicate with the processor 100. This delay period allows adequate the time to transmit EICAL_OK across the interface plus four cycles in processor 100 to deglitch EICAL_OK in order to gate IOVALID in processor, plus more cycles of margin, if desired. For the default may be 12 bus cycles, but programmable up to 64 or more bus cycles.

Maintenance control logic 104 in processor 100 deglitches EICAL_OK to form an internal indication EICAL_READY at which time it gates IOVALID to I/O control 140. Maintenance control logic 104 also at this time sets IO_EICAL_ACTIVE to the elastic interfaces 51 and 53 in processor 102 that communicate with I/O control 140.

Maintenance control logic 104 waits for a calibration period (typically 64 or 128 bus cycles) and then drops IO_EICAL_ACTIVE. Maintenance control logic 104 then waits a smaller programmable number of bus cycles before dropping IO_EICAL. This is done to give the receive side time to see good functional data from processor 100 before IOVALID is degated in I/O control chip 140.

Maintenance control logic 150 in I/O control chip 140 then drops EICAL_ACTIVE to its elastic interfaces 51 and 53 that communicate with processor 100 when the EICAL_REQUEST indication drops, due to IO_EICAL dropping.

Maintenance control logic 150 in I/O control chip 140 then waits a smaller programmable number of bus cycles (for example, four bus cycles) before dropping EICAL_OK to processor 100. This is to give the valid system data time to reach processor 100 through the elastic interfaces 52 and 54.

After a fixed number of cycles to allow the EI RCV interface 53 to settle) after EICAL_REQUEST drops, maintenance control logic 150 drops GATE_IOVALID to the internal I/O adapter control logic 148.

Maintenance control logic 150 logic then waits the programmable delay period (again for example 12 bus cycles) before dropping HOLD_IOCHIP to internal I/O control chip logic 148. After seeing EICAL_OK drop, maintenance control logic 104 in processor chip 100 degates IOVALID and drops HOLD_IO. In the above example, the idle and recall of both sides of interface is done at the same time. It should be understood that the idle and recall for each side can be done independently, if desired.

Figure 6:
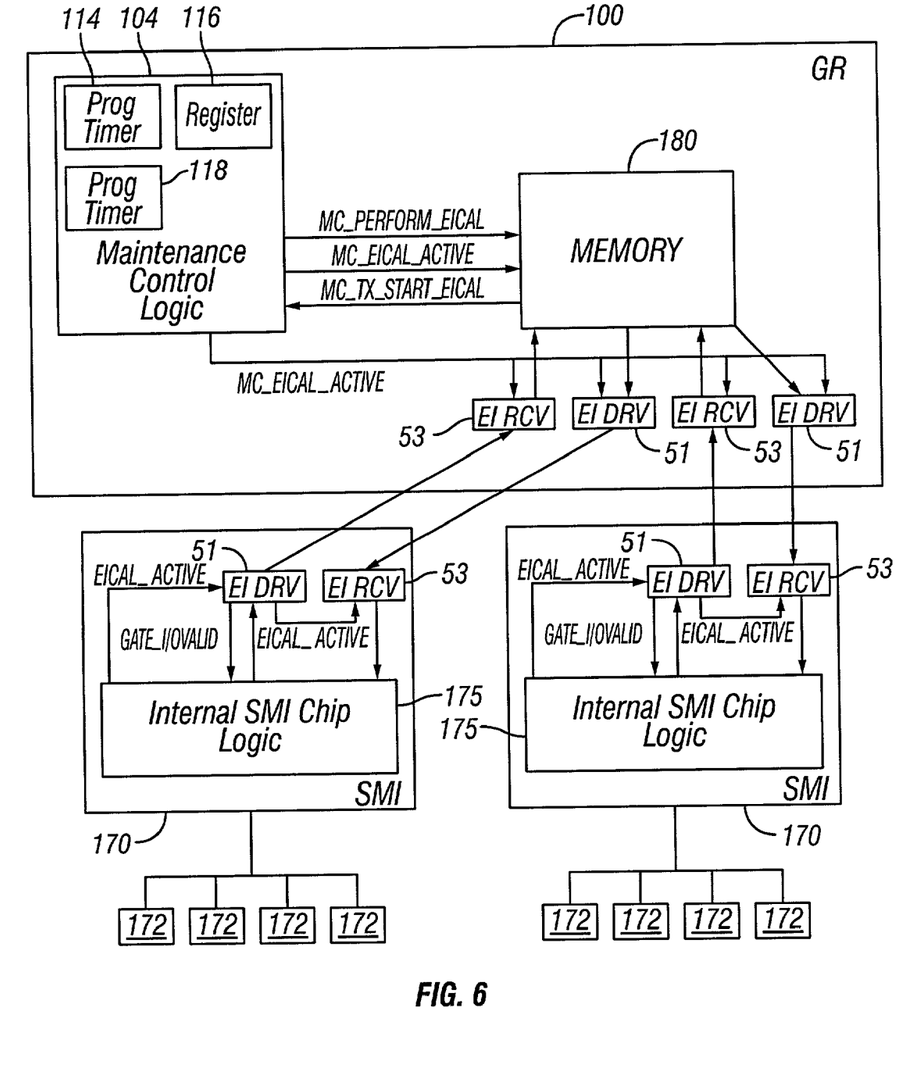
FIG. 6 is a block diagram of a calibration system with periodic idling of the tunable interfaces between the processor and the RAM memory of the data processing system of FIG. 1.

FIG. 6 in the drawings illustrates the data processing system 10 periodically providing idle intervals at scheduled intervals for recalibration of tunable interfaces.

In FIG. 6, the structure of data processing system is shown for providing idle intervals between the processor chip 100 and at least two synchronous memory interfaces or SMI's 170. It should be understood that the techniques described are applicable as well when fewer or more synchronous memory interfaces are present.

In FIG. 6, the processor 100 is a first data processing device and each synchronous memory interface 170 is a second data processing device according to the present invention. As with the structure shown in FIG. 4, only the processor 100 is capable of initiating interface activity. In the structure of FIG. 6, each synchronous memory interface 170 is connected to and controls a set of four DRAM memory modules 172 of like construction. The present invention takes advantage of the periodic memory refresh intervals required for the DRAM memories 172 and uses such memory refresh intervals for recalibration of the elastic interfaces 51 and 53 between the processor 100 and each individual synchronous memory interface 170. In FIG. 6, like structure to that of FIGS. 4 and 5 bears like reference numerals. However, the timers 114 and 118 are not required for the operations described with respect to FIG. 6.

Thus, the microprocessor chip 100 includes maintenance control logic 104, and other conventional components of processor chip as well as those shown in FIG. 4 not involved in recalibration of the elastic interfaces 51 and 53 between the processor 100 and the synchronous memory interfaces 170 is not shown in order to preserve clarity in the drawings. The microprocessor 100 includes a memory control logic 180 which communicates with each individual synchronous memory interface 170 through elastic interfaces 51 and 53 like in construction to those described above. Each individual synchronous memory interface 170 communicates through elastic interfaces 51 and 53 with the processor 100 and internal chip logic 175.

In the operation of the portions of data processing system 10 shown in FIG. 6, START_EICAL is a level from memory control logic 180 to maintenance control logic 104 indicating that an EPICAL command has been sent to the SMI's 170. EICAL_ACTIVE is a level from maintenance control logic 104 indicating that the idle interval is in effect and that the interfaces are in their recalibration process. As a handshake mechanism, START_EICAL from memory control logic 180 is dropped when EICAL_ACTIVE is indicated from the maintenance control logic 104.

EICAL_ACTIVE directly controls a mux select of MUX 78 and 79 in elastic interfaces 51 between actual system functional data and the calibration patterns. When EICAL_ACTIVE is asserted, the elastic interfaces 51 drive test data patterns of the type described above with reference to FIGS. 4 and 5 across the tunable interfaces for calibration purposes.

The idle and recalibration sequence for the elastic interfaces 51 and 53 between the processor 100 and the synchronous memory interfaces 170 is incorporated into the normal IDLE_SYNC command that memory control logic 180 periodically sends to the synchronous memory interfaces 170. For the purposes of operations according to the present invention, this IDLE_SYNC command signal is referred to in the discussion hereinafter as the EPICAL command. This EPICAL function is controlled via the conventional refresh control of the memory control logic 180 typically present as the self time refresh or STR signal, together with the EPICAL facilities, either as an additional bit of or as an extension of the function in such command sent by the memory control logic 180.

When the DRAM EPICAL function is enabled, memory control logic 180 sees a customary timer pulse indicating that a DRAM refresh command needs to be issued, causing an ENTER_STR command request followed by an EPICAL command request. The memory control logic 180 then performs its customary sequence and issues the ENTER_STR command for the SMI's 170 to enter the self time refresh mode.

The sequencer in memory control logic 180 issues the EPICAL command to the SMI's 170 across the functional memory bus. At the same time, memory control logic 180 asserts the MEMC_START_EICAL signal to the maintenance control logic 104. The sequencer in memory control logic 180 then holds off sending a "done" or function complete signal to the arbiter until it detects a falling edge on the EICAL_ACTIVE input from the maintenance control logic 104 as a handshake.

Maintenance control logic 104 detects a rising edge on MEMC_START_EICAL from memory control logic 180, then waits a programmable number of cycles set by timer 118 to allow the two SMI's 170 a chance to enter EPICAL, then in turn asserts the EICAL_ACTIVE signal back to the memory control logic 180 and to the elastic interfaces 51 and 53 of processor 100.

When the sequencer in memory control logic 180 detects a rising edge on EICAL_ACTIVE, it then deasserts the MEMC_START_EICAL signal back to maintenance control logic 104. When the SMI's 170 receive the EPICAL command, they assert EICAL_ACTIVE to their elastic interfaces 52 and 54 and gate its internal IOVALID.

Programmable timer 118 is set for a time that takes into account the time for the command to be processed by the memory interface chip 170 plus the recalibration period. After the time set by programmable timer 118 expires, maintenance control logic 104 deactivates EICAL_ACTIVE to both the elastic interfaces 51 and 53 and to the memory control logic 180. Likewise, the internal control logic 175 of the SMI's 170 deasserts EICAL_ACTIVE to its internal elastic interfaces 51 and 53 after a time set by the programmable timer 118.

The SMI's 170 then wait an additional timer period of timer 118 before removing their internal IOVALID to give the interface in processor 100 time to exit EPICAL. When the sequencer in memory control logic 180 detects a falling edge on EICAL_ACTIVE, it sends the "done" for the EPICAL command back to the arbiter in memory control logic 180 which exits the self refresh mode and resumes normal data processing operations. It is to be noted that since the memory control logic 180 is not expecting data on its interface, no IOVALID gating is needed in processor 100 for the EPICAL operation relating to the SMI's 170.

Figure 7:
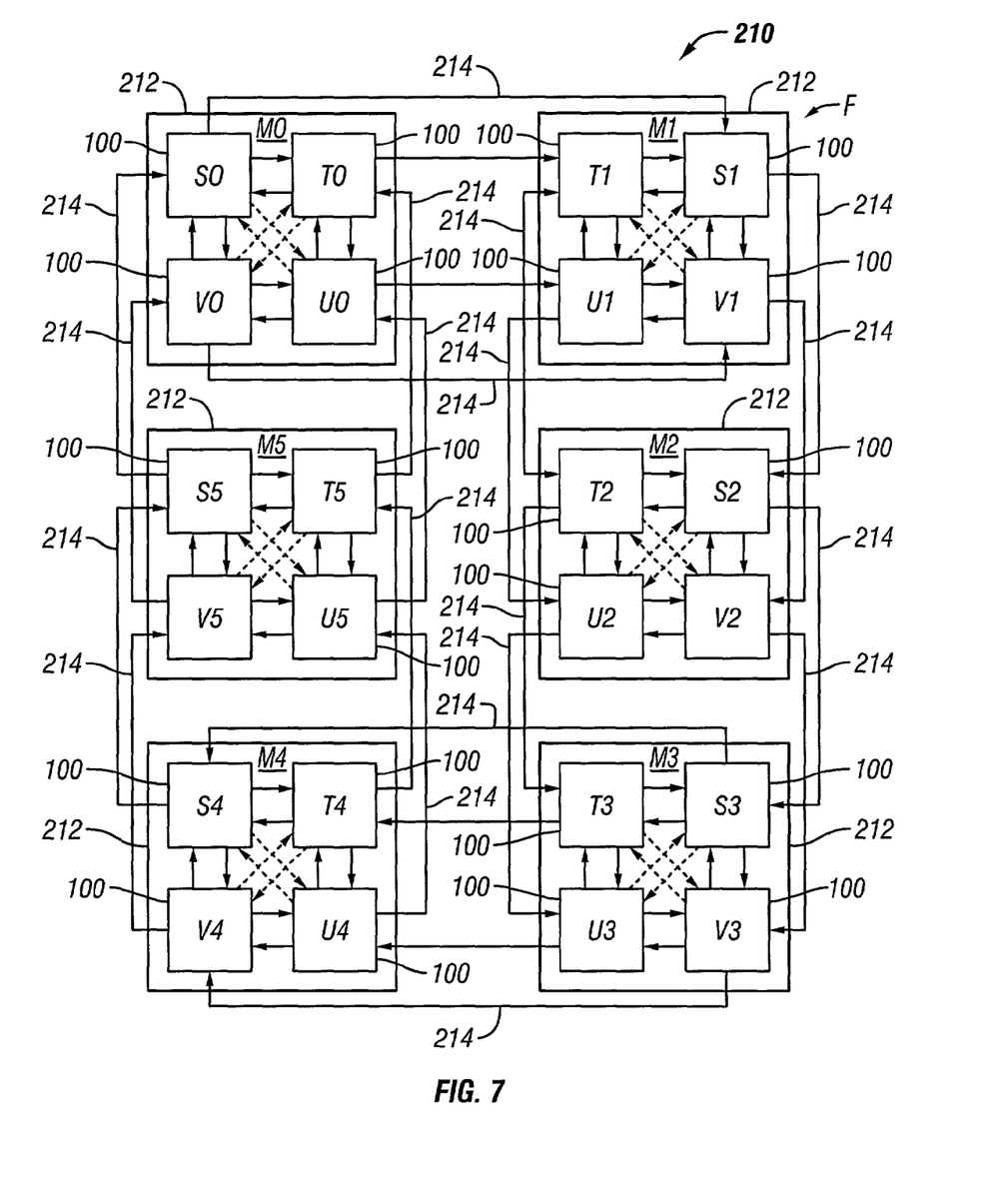
FIGS. 7 and 8 are block diagrams of an alternative embodiment of a data processing system according to the present invention.
Figure 8:
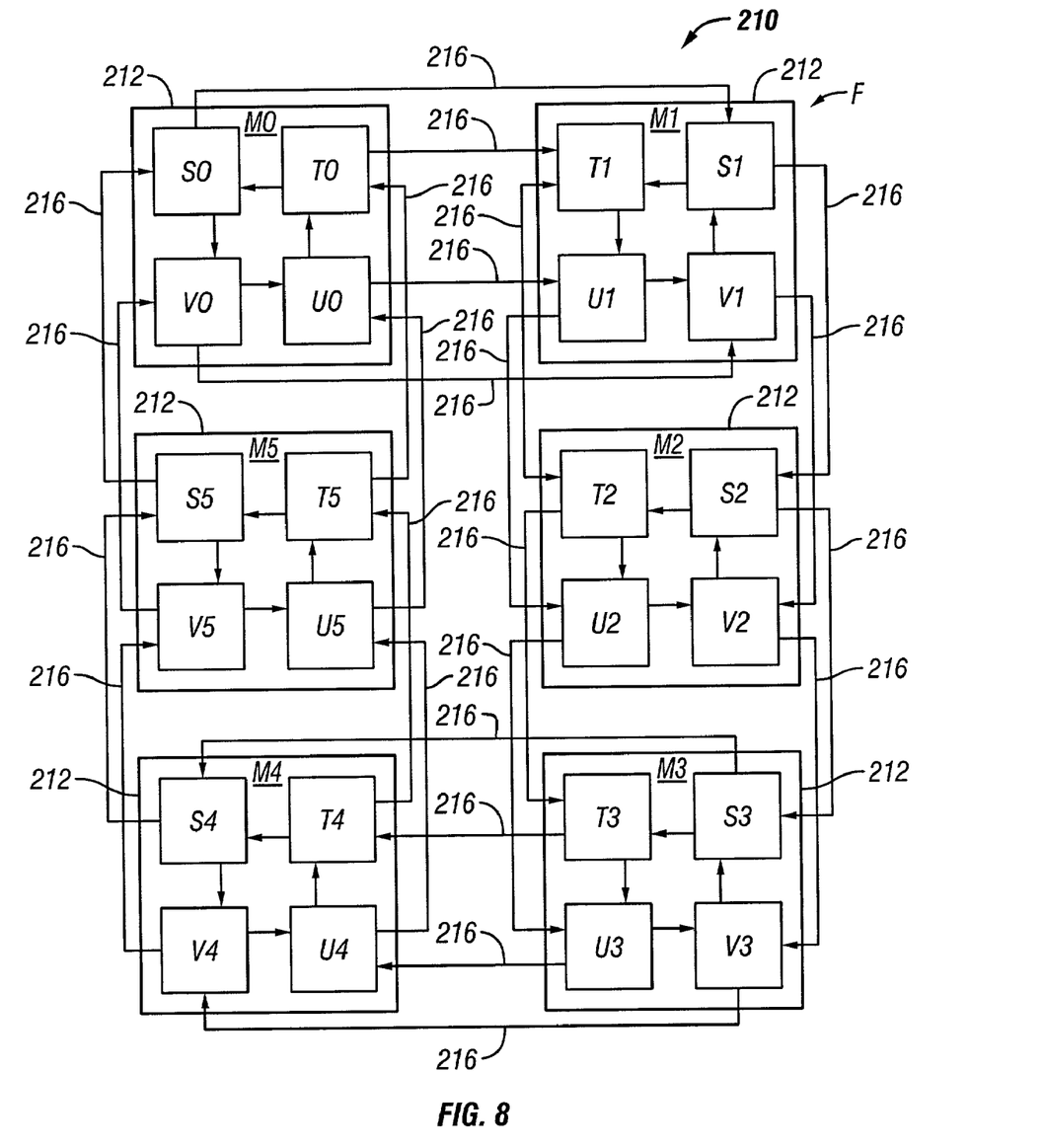

FIGS. 7 and 8 of the drawings illustrate an alternative data processing system 210 with which the present invention may be practiced. The data processing system 210 is composed in what is known as a fabric F formed of microprocessors 100, each microprocessor 100 of like construction and arranged as one node in a multi-chip module 212 of four microprocessors. Six multichip modules 212 are provided in the embodiment of FIG. 7, designated as modules M0, M1, M2, M3, M4 and M5. The four processors 100 in each multichip module 212 are designated S, T, U and V, respectively. In FIG. 7, connection of each processor 100 in each module 212 for transfer of data, address and control is shown schematically by a single connector arrow 214 in each instance representing the several buses present for these purposes.

FIG. 8 of the drawings illustrates the transfer of EPICAL signals across the fabric F between the processors thereof. A connector 216 is provided between each processor 100 in the fabric F and one or more adjacent processors to fully connect all of the processors 100 together to fully communicate the EPICAL signals to each processor in the fabric F.

Figure 9:
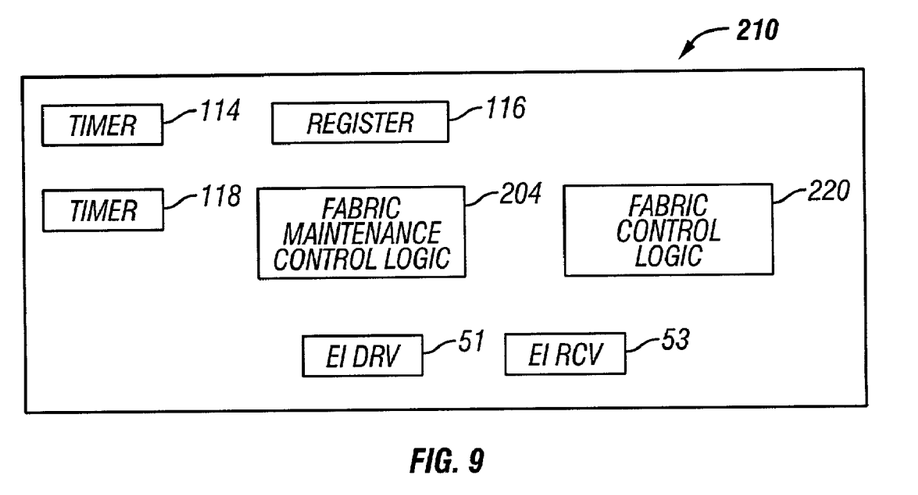
FIG. 9 is a block diagram of selected portions of a processor of the data processing system of FIGS. 7 and 8.

FIG. 9 is a block diagram of portions of processor chip 100 of the data processing system of the fabric of FIGS. 7 and 8. Those portions of the processor 100 shown in FIG. 9 control the idling of the transfer of system data across the fabric F according to the present invention. Components in FIG. 9 of the processor 100 which operate in a like manner to the embodiments of FIGS. 4, 5 and 6 bear like reference numerals.

The elastic interfaces 51 and 53 of the type described above are provided in the fabric F for the communication buses 214, as shown schematically in FIG. 7. One of the processors 100, for example the processor S0 in module 0, in the fabric of processors shown in FIG. 7 is configured as the primary chip for the purposes of initiating the procedure of providing idle intervals for the purpose of recalibration of the elastic interfaces 51 and 53.

The idling and recalibration process of the fabric of processors 210 illustrated in FIG. 7 begins when a PERFORM_FBC_EICAL pulse occurs in fabric maintenance control logic 204 in what is configured to be the primary processor chip 210. The frequency of occurrence of the PERFORM_FBC_EICAL signal is programmable in the programmable timer 114 of the primary processor chip 210 in the manner set forth above, such as once every 100 msec, and this signal is provided for each interface in the fabric. If PERFORM_FBC_EICAL occurs before the last FBC_EICAL has completed, then maintenance control logic 104 sets an error bit in one of the conventional fault isolation registers present in processor chip 210.

Fabric maintenance control or EPICAL activator logic 204 in the primary processor 210 pulses then causes the fabric control logic 220 to inject a "HALT FABRIC" packet onto the fabric F. As each processor chip 210 in the fabric sees the HALT FABRIC packet as indicated by connector arrow 214 (FIG. 8), it stops allowing any new commands or data to be placed onto the fabric F. In addition, the fabric control logic 220 in each processor raises a fabric halted indication back to its local maintenance control logic 204. The primary processor chip may either wait until the HALT FABRIC packet returns from the fabric before asserting the halted indication, or an additional amount of time can be programmed to the settings of cycle count timer 118 for packet transmission time around the fabric.

In response to the fabric halted indication, the fabric maintenance control logic 204 in the each individual processor 210 holds any new or current control packets from transmission over the fabric, unless that fabric maintenance control logic 204 is already in the process of sending such a packet out to the next processor chip.

The primary maintenance control 204 waits a programmable amount of time set by timer 118 after seeing the fabric halted indication. Preferably, this time is at least equal to the maximum latency of outstanding fabric traffic that already in existence before the halt was seen. This time must also be greater than the transmission time length of the sideband command packet sent over the fabric by connectors 216 to guarantee that the sideband command packet is received and held at the various processors.

Figure 10A:
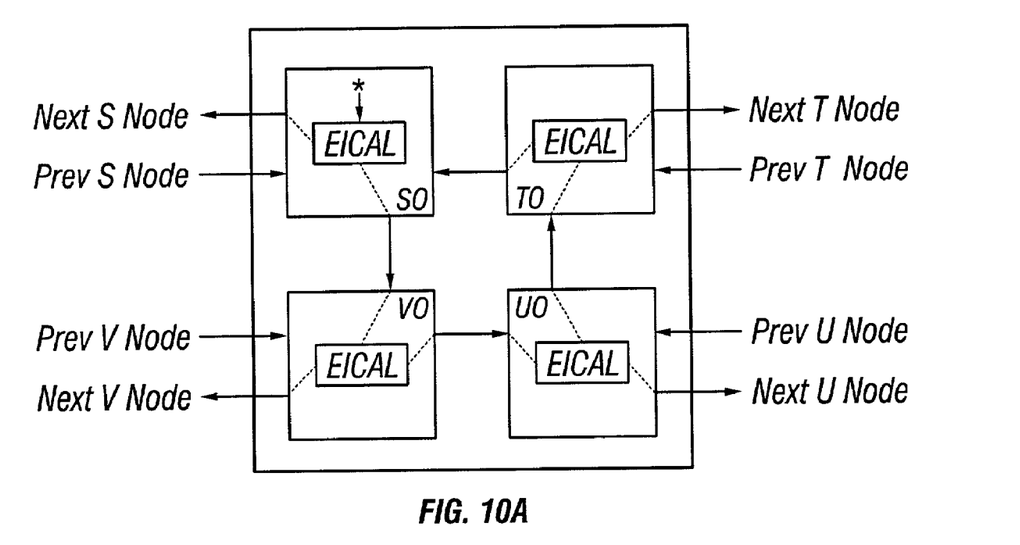
FIGS. 10A and 10B are block diagrams illustrating routing signals for periodic idling of the interfaces in the data processing system of FIGS. 7 and 8.
Figure 10B:
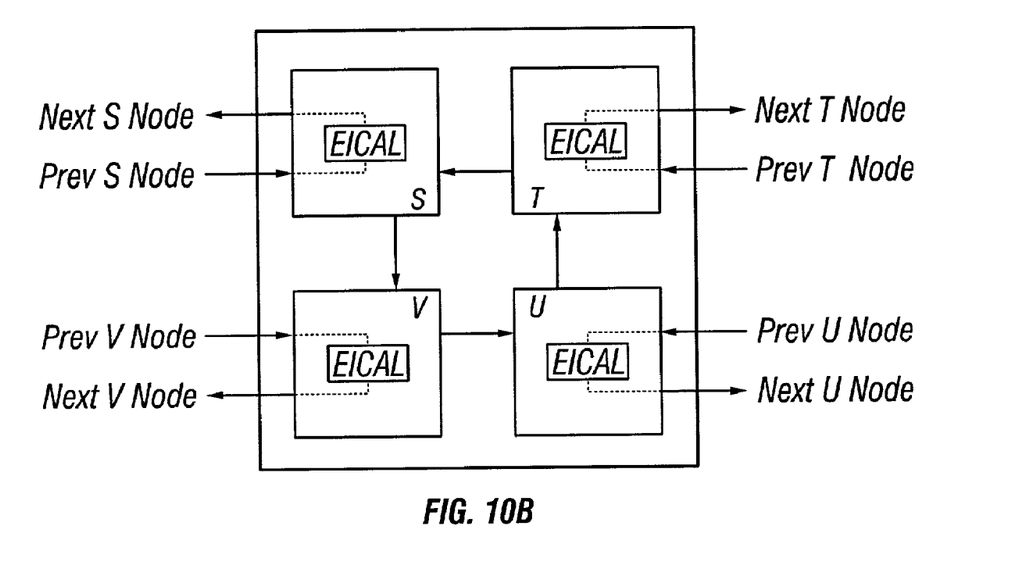

The maintenance control logic 204 in the primary processor 210 activates a virtual EPICAL input to self-start the idle and recalibration process, as indicated in FIG. 10A by a star symbol to processor S0 in the primary module. Specifically, when any maintenance control logic 204 detects an EPICAL indication come in from another chip, or the virtual one from the initiating processor 100, the detecting maintenance control logic asserts an FBC_EICAL_IN-PROGRESS to its internal logic. FIG. 10A illustrates the routing of the fabric EPICAL signal in the primary processor 210 of the fabric of FIG. 7. FIG. 10B represents the routing of the fabric EPICAL signal in the other processor modules of FIG. 7.

Whenever maintenance control logic 204 on any processor chip 210 detects assertion of the FBC_EICAL_IN-PROGRESS and an EPICAL input from another processor chip 210 (or the virtual EPICAL input) are both active, it gates off IOVALID to its fabric control logic circuit 220. On the rising edge of the FBC_EICAL_INPROGRESS, the maintenance control logic 104 on each processor chip 210 also does the following:
 a. raises EPICAL on all its elastic interfaces 51 and 53 with other processors in the fabric;
 b. waits for a programmable amount of time set by timer 118 at least equal to the time it takes for the all adjacent processor chips to receive EPICAL mode;
 c. raises EICAL_ACTIVE to its internal elastic interfaces;
 d. waits for a time set by the programmable timer 118 for the elastic interfaces in the fabric to complete the EPICAL process;
 e. drops EICAL_ACTIVE to its internal interfaces 51 and 53 and deasserts EPICAL to adjacent processor chips 210. The primary maintenance control logic 204 also drops its virtual EPICAL input.

The maintenance control logic 204 in primary processor 210 waits for a programmable time equal to the additional time in addition to the time already spent that it takes for all processor chips 210 on the fabric to complete EPICAL. The maintenance control logic 204 in primary processor 210 sends a fabric resume indication to the fabric control logic 220, which causes the fabric control logic 220 to inject a "Fabric Resume" packet onto the fabric F. At this time all fabric EPICAL inputs to all processor chips should now be inactive, and therefore all IOVALIDS should now be ungated, the "Fabric Resume" packet flows around the fabric. When a maintenance control logic 204 of any of the processors 210 sees the falling edge of fabric halted indication, it clears its internal FBC_EICAL_INPROGRESS logic.

In summary, in the operation of the present invention, a programmable timer for each interface is built into the computer system (preferably in the central microprocessor chip) to periodically initiate a recalibration. When it is time to perform a recalibration, the arbiter for that interface is asked to hold off all new traffic on that interface, i.e., do not allow any new requests to be transmitted. Existing queues and hold-off mechanisms hold new requests that come in during the recalibration period. Then, a period of time is allowed to elapse which is sufficient for any outstanding requests to finish using that interface, after which time the interface can be regarded as "idle."

Once an interface is idle, the interface circuits are told to transmit the "rich" calibration or test data set across the interface. After the test data patterns have been transmitted, the receiving interface circuits 53 are told to perform the adjustment to the interfaces needed after seeing the rich set of patterns.

During the transmission of patterns and adjustment of the interface, each involved receiving interface 53 is gated off from accepting data from its interface since "garbage" patterns are being transmitted and might be mistaken for new commands or ECC errors. After transmission and adjustment is complete, the arbiter for that interface is released, allowing normal interface activity to continue.

The present invention works well for "slave" type interfaces, such as cache and memory interface chips where the master (microprocessor chip) is the only chip to initiate interface activity and the data return time is measured in cycles. In this case stopping the arbiter in the master is all that is necessary. The present invention also provides for more complex situations which occur. For example, additional complication occurs for interfaces with I/O devices where it takes data a long time to return (disk drive, NUMA bridge) and/or the devices (or I/O control chip) themselves can initiate traffic back in the other direction (e.g., external interrupts). For this type interface it is necessary to hold the arbiters on both sides of the interface and wait until both sides of the interface are idle before starting the recalibration.

Thus, with the present invention, interface calibrations operate in concert with the data processing system—recalibration is performed while no mission critical data is being transmitted. The re-calibrations can now take place and if data is corrupted, it is test data and of no consequence.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A data processing system comprising:
 a first data processing device, a second data processing device, and a third data processing device;
 a communication fabric including at least a first communication link coupling the first and second data processing devices for point-to-point communication therebetween and a second communication link coupling the second and third data processing devices for point-to-point communication therebetween;
 fabric maintenance logic that generates a recalibration signal;
 fabric control logic coupled to the communication fabric, wherein the fabric control logic, responsive to the recalibration signal, transmits a halt packet via the first and second communication links to multiple ones of the first, second and third data processing devices to concurrently idle transfer of system data on the first and second communication links between the first, second, and third data processing devices; and
 a collection of tunable interfaces within the first, second and third data processing devices that communicates test data via the first and second communication links while transmission of system data via the first and second communication links is idle, wherein said collection of tunable interfaces recalibrates a parameter of transmission of system data via the communication fabric in response to communication of the test data over the first and second communication links.

2. The data processing system of claim 1, wherein the first data processing device includes the fabric control logic.

3. The data processing system of claim 1, further including:
 means for insuring that transfer of system data between the first and second data processing devices is complete before transmitting test data between them.

4. The data processing system of claim 1, wherein each of the first, second and third data processing devices is a respective one of first, second and third processors.

5. The data processing system of claim 1, wherein said fabric maintenance logic generates the recalibration signal at predetermined time intervals.

6. The data processing system of claim 5, wherein said fabric maintenance logic generates the recalibration signal at predetermined time intervals equally spaced in time from preceding and succeeding time intervals.

7. The data processing system of claim 5, wherein said fabric maintenance logic generates the recalibration signal at predetermined time intervals of increased frequency during start-up of the data processing system.

8. The data processing system of claim 5, fabric maintenance logic generates the recalibration signal at predetermined time intervals of increased frequency during shut-down of the data processing system.

9. The data processing system of claim 1, wherein said fabric maintenance logic generates the recalibration signal in response to a system upgrade.

10. The data processing system of claim 1, wherein said fabric maintenance logic generates the recalibration signal in response to system maintenance.

11. The data processing system of claim 1, wherein said fabric maintenance logic generates the recalibration signal in response to environmental conditions.

12. A data processing system implemented method of communication in a data processing system including tunable interfaces connecting data processing devices while maintaining integrity of system data begin processed in the data processing system, said method comprising:
    communicating system data between a first data processing device, a second data processing device, and a third data processing device via a communication fabric including at least a first communication link coupling the first and second data processing devices for point-to-point communication and a second communication link coupling the second and third data processing devices for point-to-point communication;
    generating a recalibration signal;
    in response to the recalibration signal, transmitting a halt packet via the first and second communication links to multiple ones of said first, second and third data processing devices to concurrently idle transfer of system data between the first, second and third data processing devices via the communication fabric; and
    thereafter, transmitting test data between the first, second and third data processing devices via the first and second communication links while system data transfer is idle; and
    a collection of tunable interfaces within the first, second and third data processing device recalibrating a parameter of transmission of system data via the communication fabric in response to communication of the test data over the first and second communication links.

13. The method of claim 12, further including the step of: insuring that transfer of system data between the first and second data processing devices is complete before the step of transmitting test data.

14. The method of claim 12, wherein one of the data processing devices is a processor.

15. The method of claim 12, wherein said step of generating the recalibration signal comprises the step of:
    generating the recalibration signal at predetermined time intervals.

16. The method of claim 15, wherein said step of generating the recalibration signal comprises the step of:
    generating the recalibration signals at predetermined time intervals equally spaced in time from preceding and succeeding time intervals.

17. The method of claim 15, wherein said step of generating to recalibration signal comprises the step of:
    generating the recalibration signal at predetermined time intervals of increased frequency during start-up of the data processing system.

18. The method of claim 12, wherein said step of generating the recalibration signal comprises the step of:
    generating the recalibration signal at predetermined time intervals of increased frequency during shut-down of the data processing system.

19. The method of claim 12, wherein said step of generating the recalibration signal comprises the step of:
    generating the recalibration signal in response to a system upgrade.

20. The method of claim 12, wherein said step of generating the recalibration signal comprises the step of:
    generating the recalibration signal in response to system maintenance.

21. The method of claim 12, wherein said step of generating the recalibration signal comprises the step of:
    generating to recalibration signal in response to environmental conditions.

22. A first data processing device for a data processing system including at least first, second and third data processing devices and a communication fabric including at least a first communication link coupling the first and second data processing devices for point-to-point communication and a second communication link coupling the second and third data processing devices for point-to-point communication, said first data processing device comprising:
    fabric maintenance logic that generates a recalibration signal at predetermined intervals;
    fabric control logic, coupled to communication fabric, that responsive to the recalibration signal transmits a halt packet via the first and second communication links to multiple ones of said first, second and third data processing devices to concurrently idle transfer of system data on the first and second communication links between the first, second and third data processing devices; and
    a tunable interface that communicates test data via to first and second communication links while transmission of system data via the first and second communication links is idle, wherein said tunable interface recalibrates a parameter of transmission of system data in response to communication of the test data over the first and second communication links.

23. A data processing system comprising:
    a first data processing device, a second data processing device, and a third data processing device;
    a communication fabric including at least a first communication link coupling the first and second data processing devices for point-to-point communication and a second communication link coupling the second and third data processing devices for point-to-point communication;
    fabric maintenance logic that generates a recalibration signal at predetermined intervals;
    fabric control logic, coupled to the communication fabric, that responsive to the recalibration signal transmits a halt packet via the first and second communication links to concurrently idle transfer of system data on the first and second communication links between the first, second and third data processing devices; and a collection of tunable interfaces within the first, second and third data processing devices that communicates test data via the first and second communication links during a test period while transmission of system data is idle, wherein said test data includes a greater number of transitions and logic levels in said test period than a corresponding period of transmission of system data, wherein said collection of tunable interfaces recalibrates a parameter of transmission of system data in response to communication of the test data over the first and second communication links in order to compensate for at least one of a set of temperature drift and voltage drift.

24. The data processing system of claim 23, wherein:
said second data processing device comprises a dynamic random access memory (DRAM); and
said fabric control logic idles transfer of system data during a refresh cycle of the DRAM.

25. The data processing system of claim 23, wherein said fabric maintenance logic generates said recalibration signal at predetermined time intervals of increased frequency during start-up of the data processing system.

* * * * *